US011507618B2

(12) United States Patent
Venkataraman et al.

(10) Patent No.: US 11,507,618 B2
(45) Date of Patent: Nov. 22, 2022

(54) SYSTEMS AND METHODS FOR FLEXIBLY USING TRENDING TOPICS AS PARAMETERS FOR RECOMMENDING MEDIA ASSETS THAT ARE RELATED TO A VIEWED MEDIA ASSET

(71) Applicant: Rovi Guides, Inc., San Jose, CA (US)

(72) Inventors: Sashikumar Venkataraman, Andover, MA (US); Vineet Agarwal, Andover, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/066,210

(22) PCT Filed: Oct. 31, 2016

(86) PCT No.: PCT/US2016/059659
§ 371 (c)(1),
(2) Date: Jun. 26, 2018

(87) PCT Pub. No.: WO2018/080532
PCT Pub. Date: May 3, 2018

(65) Prior Publication Data
US 2020/0167386 A1 May 28, 2020

(51) Int. Cl.
*G06F 16/783* (2019.01)
*G06F 16/74* (2019.01)
(Continued)

(52) U.S. Cl.
CPC .......... *G06F 16/783* (2019.01); *G06F 16/735* (2019.01); *G06F 16/743* (2019.01); *G06Q 30/0631* (2013.01); *H04N 21/4826* (2013.01)

(58) Field of Classification Search
CPC .... G06F 16/783; G06F 16/735; G06F 16/743; H04N 21/4826; G06Q 30/0631
See application file for complete search history.

(56) References Cited

U.S. PATENT DOCUMENTS 6,239,794 B1 5/2001 Yuen et al.
6,564,378 B1 5/2003 Satterfield et al.
(Continued)

FOREIGN PATENT DOCUMENTS

JP 2003316386 A 11/2003
JP 2004510209 A 4/2004
(Continued)

OTHER PUBLICATIONS

International Search Report and Written Opinion of PCT/US2016/059659 dated Feb. 3, 2017.

*Primary Examiner* — Anhtai V Tran
*Assistant Examiner* — Xiaoqin Hu
(74) *Attorney, Agent, or Firm* — Haley Guiliano LLP

(57) ABSTRACT

Systems and methods are provided herein for flexibly using trending topics as parameters for recommending media assets that are related to a viewed media asset. A media guidance application may determine that a user has viewed a media asset. The media guidance may identify a plurality of attributes corresponding to the viewed media asset and determine that a respective attribute of the plurality of attributes matches a trending topic. The media guidance application may update a set of weightings corresponding to the plurality of attributes by increasing a weighting corresponding to the respective attribute and adjust a recommendation for a media asset different from the viewed media asset based on the updated set of weightings. The media guidance application may generate for display the recommendation of the media asset different from the viewed media asset.

18 Claims, 6 Drawing Sheets

(51) Int. Cl.
  *G06F 16/735* (2019.01)
  *G06Q 30/06* (2012.01)
  *H04N 21/482* (2011.01)

(56) References Cited

U.S. PATENT DOCUMENTS

| | | | |
|---|---|---|---|
| 7,165,098 | B1 | 1/2007 | Boyer et al. |
| 7,761,892 | B2 | 7/2010 | Ellis et al. |
| 8,046,801 | B2 | 10/2011 | Ellis et al. |
| 8,249,876 | B1 | 8/2012 | Ainslie |
| 8,577,671 | B1 | 11/2013 | Barve et al. |
| 9,123,339 | B1 | 9/2015 | Shaw et al. |
| 9,237,386 | B2 | 1/2016 | Oztaskent et al. |
| 9,462,342 | B2 * | 10/2016 | Krishnamurthy .. H04N 21/4826 |
| 9,514,743 | B2 | 12/2016 | Skobeltsyn et al. |
| 10,339,917 | B2 | 7/2019 | Aleksic et al. |
| 2002/0174430 | A1 | 11/2002 | Ellis et al. |
| 2003/0216912 | A1 | 11/2003 | Chino |
| 2005/0182504 | A1 | 8/2005 | Bailey |
| 2005/0251827 | A1 | 11/2005 | Ellis et al. |
| 2006/0182291 | A1 | 8/2006 | Kunieda et al. |
| 2008/0134866 | A1 | 6/2008 | Brown |
| 2009/0006368 | A1 * | 1/2009 | Mei ....................... G06F 16/735 |
| 2009/0006388 | A1 | 1/2009 | Ives et al. |
| 2009/0228273 | A1 | 9/2009 | Wang et al. |
| 2010/0153885 | A1 | 6/2010 | Yates |
| 2012/0166438 | A1 | 6/2012 | Wu et al. |
| 2013/0097101 | A1 | 4/2013 | Ortiz |
| 2013/0262117 | A1 | 10/2013 | Heckmann |
| 2013/0294755 | A1 | 11/2013 | Arme et al. |
| 2013/0347038 | A1 | 12/2013 | Lee |
| 2014/0337370 | A1 | 11/2014 | Aravamudan et al. |
| 2015/0206535 | A1 | 7/2015 | Iwai |
| 2015/0234820 | A1 | 8/2015 | Aravamudan |
| 2015/0279363 | A1 | 10/2015 | Furumoto |
| 2016/0142783 | A1 * | 5/2016 | Bagga ................ H04N 21/4668 725/47 |
| 2016/0188574 | A1 | 6/2016 | Homma et al. |
| 2016/0188729 | A1 | 6/2016 | Ardhanari et al. |
| 2016/0274744 | A1 * | 9/2016 | Neumann ........ H04N 21/47202 |
| 2017/0069309 | A1 | 3/2017 | Aleksic et al. |
| 2017/0160813 | A1 | 6/2017 | Divakaran et al. |
| 2018/0151176 | A1 | 5/2018 | Qian et al. |
| 2019/0287533 | A1 | 9/2019 | Homma et al. |
| 2020/0357391 | A1 | 11/2020 | Ghoshal et al. |

FOREIGN PATENT DOCUMENTS

| | | |
|---|---|---|
| JP | 2006209069 A | 8/2006 |
| JP | 2008097082 A | 4/2008 |
| JP | 2010128015 A | 6/2010 |
| JP | 2011059194 A | 3/2011 |
| JP | 2016062069 A | 4/2016 |
| JP | 2016180917 A | 10/2016 |
| KR | 20070061266 B1 | 6/2007 |
| WO | 2002027711 | 4/2002 |
| WO | WO 2016020464 | 2/2016 |

* cited by examiner

801 Initialization subroutine
805 Receive instances of identifiers of attributes
806    For each identifier of an attribute
807       Query database for entries matching identifier of attribute
808       If entries found that match the identifier of the attribute
810          Update a set of weightings by increasing a weighting associated with the attribute
817 Termination subroutine

FIG. 8

SYSTEMS AND METHODS FOR FLEXIBLY USING TRENDING TOPICS AS PARAMETERS FOR RECOMMENDING MEDIA ASSETS THAT ARE RELATED TO A VIEWED MEDIA ASSET

CROSS-REFERENCE TO RELATED APPLICATIONS

This application is a national stage application under 35 U.S.C. § 371 of International Application PCT/US2016/059659, filed Oct. 31, 2016, which is hereby incorporated by reference herein in its entirety.

BACKGROUND

In certain applications, it may be desirable to account for trending topics when recommending media assets to users. Because trending topics may be of more interest to users than other topics, media assets recommended based on trending topics may conform more to users' current preferences than media assets not recommended based on trending topics. The related art is directed to providing suggested search requests based on words in a previous search request that are relevant to trending topics. However, the flexibility with which trending topics are used in the related art is limited.

SUMMARY

Accordingly, methods and systems are disclosed herein for a media guidance application that uses a trending topic as a flexible parameter for determining recommended media assets based on a viewed media asset. In particular, the media guidance application determines that a user has viewed a media asset. The media guidance application determines attributes of the media asset, such as actor, director, plot detail, etc. The media guidance application compares these attributes to a collection of trending topics to determine if any of the attributes are trending topics. When the media guidance application recommends to the user other media assets that share attributes of the media asset the user viewed, the media guidance application may weight trending attributes more heavily when determining what to recommend. For example, if a user is watching the movie Good Will Hunting after Robin Williams (an actor in Good Will Hunting) died, Robin Williams may be a trending topic. Accordingly, the media guidance application may weight Robin Williams more heavily when determining what other movies to recommend.

In the steps described above, results are determined based on how related they are to a trending topic in cooperation with other criteria. For example, if a user is watching the movie Good Will Hunting and Robin Williams (an actor in Good Will Hunting) is trending, the media guidance application may recommend media assets by utilizing Robin Williams as well as other attributes of Good Will Hunting such as Matt Damon (another actor in Good Will Hunting) and Boston (a location in Good Will Hunting). Additionally, using weighting, the contribution of a trending topic to recommendations can be modulated. For example, if Ben Affleck (another actor in Good Will Hunting) is trending but has a minimal role in Good Will Hunting, Ben Affleck may not play a large role in recommending media assets. Thus, a trending topic becomes a flexible parameter for determining results, rather than being the sole criterion.

To this end, in some aspects of the disclosure, a media guidance application executed by control circuitry of user equipment may determine, based on processing input signals at the user equipment, that a user has viewed a media asset. For example, the media guidance application may determine that the user has viewed a media asset based on processing input signals transmitted to the user equipment from a user input interface, such as a remote control, touchscreen (on a mobile phone, tablet, etc.), keyboard, mouse, game controller, etc.

In some embodiments, the media guidance application may identify a plurality of attributes corresponding to the viewed media asset. For example, the media guidance application may identify attributes regarding an actor, director, location, date of release, plot detail, and/or award of the viewed media asset. For example, if the media asset is the movie Good Will Hunting, the media guidance application may identify attributes such as Robin Williams, Matt Damon, Ben Affleck (actors in Good Will Hunting), Gus Van Sant (director of Good Will Hunting), Boston (location of Good Will Hunting), 1998 (year of release of Good Will Hunting), math (a plot detail in Good Will Hunting), and Academy Award for Best Actor (an award won by Good Will Hunting).

In some embodiments, the media guidance application may compare each of the plurality of attributes corresponding to the viewed media asset to a plurality of topics with which a threshold number of people have interacted within a period of time that is shorter than a threshold period of time. For example, the trending topics may be determined by monitoring a number of people who have written emails or text messages about certain topics within the threshold period of time. For example, the trending topics may be determined by monitoring messages and posts on social networking services such as Twitter or Facebook, and determining that the threshold number of people have posted and/or viewed messages and/or posts regarding certain topics within the threshold period of time. For example, the trending topics may be determined by monitoring news articles and determining that the threshold number of people have viewed news articles regarding certain topics within the threshold period of time. For example, following the death of Robin Williams (an actor), Robin Williams may have been a trending topic based on the number of people who viewed news articles regarding his death and/or the number of people who posted and/or viewed messages and/or posts regarding his death. The threshold number of people may be, for example, 10, 100, 1000, 10,000, 100,000 people, or any other suitable threshold number of people. The threshold period of time may be, for example, 15 minutes, 30 minutes, one hour, two hours, five hours, 10 hours, one day, one week, or any other suitable period of time. For example, the trending topics may be determined by determining that a threshold number of news articles, social networking posts, e-mails, etc., have been written about the topics.

In some embodiments, the media guidance application may determine that a respective attribute of the plurality of attributes matches a topic of the plurality of topics. For example, if the viewed media asset is Good Will Hunting, an attribute of the viewed media asset may be Robin Williams (an actor in Good Will Hunting). Following the death of Robin Williams, Robin Williams may have been a trending topic. If the user views Good Will Hunting following the death of Robin Williams, the media guidance application may determine that the attribute Robin Williams of Good Will Hunting matches the trending topic Robin Williams.

In some embodiments, the media guidance application may update a set of weightings corresponding to the plurality of attributes, wherein updating the set of weightings includes increasing a weighting corresponding to the respective attribute. For example, if the media asset is Good Will Hunting and the matching attribute is Robin Williams (an actor in Good Will Hunting), the media guidance application may increase the weighting of the attribute of Robin Williams. For example, if the weighting associated with the attribute of Robin Williams is 5, the media guidance application may increase the weighting to 10.

In some embodiments, the media guidance application may adjust a recommendation for a media asset different from the viewed media asset based on the updated set of weightings. For example, if the media guidance application did not have a recommendation for the user to watch the movie Dead Poets Society, if the media guidance application then determines that the user viewed Good Will Hunting and that Robin Williams (an actor in Good Will Hunting) is a trending topic, the media guidance application may increase the weighting for the Robin Williams attribute and recommend Dead Poets Society because it also features Robin Williams.

In some embodiments, the media guidance application may generate for display the recommendation for the media asset different from the viewed media asset. For example, the media guidance application may generate for display the recommendation on a display screen of the user equipment. For example, the recommendation may include a media asset identifier and/or an image for the recommended media asset and may include text saying "Recommended Movies," "We Recommend These Movies," "Recommended for You," or any equivalent. For example, the media guidance application may generate for display the recommendation at the conclusion of the user's viewing of the media asset (e.g., as the credits roll).

In some embodiments, the media guidance application may receive a search request from the user. For example, the user may use buttons on a remote control to input a search request through the media guidance application. For example, the search request may be a search request for a media asset identifier or a portion thereof, such as "Good".

In some embodiments, the media guidance application may, in response to receiving the search request, generate for display a plurality of media asset identifiers corresponding to results of a search performed based on the search request. For example, if the search request is "Good", a search may be performed for media assets with media asset identifiers (e.g., titles) containing "Good", and the media guidance application may generate for display the media asset identifiers found as a result of the search. For example, the media guidance application may generate for display the media asset identifiers "Good Will Hunting" and "Goodfellas".

In some embodiments, the media guidance application may receive a selection from the user of a media asset identifier corresponding to the viewed media asset from the plurality of media asset identifiers. For example, the user may use a remote control to select a media asset identifier, such as "Good Will Hunting" from the media guidance application in order to view the media asset Good Will Hunting.

In some embodiments, the media guidance application may adjust the recommendation for the media asset different from the viewed media asset by conditionally adjusting the recommendation for the media asset different from the viewed media asset upon a condition in which the user used the search request in order to access the viewed media asset. For example, if the user performed a search request for the media asset identifier "Good" and selected "Good Will Hunting" from a results list of media asset identifiers, the media guidance application may adjust the recommendation of the media asset different from the viewed media asset.

In some embodiments, the media guidance application may refrain from adjusting the recommendation of the media asset different from the viewed media asset when the condition is not met. For example, if the user happened upon Good Will Hunting by flipping through channels, the media guidance application may not adjust the recommendation of the media asset different from the viewed media asset.

In some embodiments, the media guidance application may receive a search request for the media asset identifier corresponding to the viewed media asset. For example, if the viewed media asset is Good Will Hunting, the search request may be for the media asset identifier "Good Will Hunting."

In some embodiments, the media guidance application may receive a search request for media assets matching an attribute of the plurality of attributes corresponding to the viewed media asset. For example, if the viewed media asset is Good Will Hunting, the search request may be for media assets having Robin Williams (an actor in Good Will Hunting) as an actor.

In some embodiments, the media guidance application may determine that the attribute of the plurality of attributes in the search request does not match a topic of the plurality of topics. For example, the search request from the user may be for media assets having Matt Damon as an actor, and Matt Damon may not be a trending topic.

In some embodiments, the media guidance application may, based on determining that the attribute of the plurality of attributes in the search request does not match a topic of the plurality of topics, refrain from adjusting the recommendation of the different media asset. For example, if the search request from the user was for media assets having Matt Damon as an actor, and Matt Damon is not trending, even if the user accessed the movie Good Will Hunting (in which Matt Damon features) based on this search request, and even if another attribute of Good Will Hunting such as Robin Williams (another actor in Good Will Hunting) is trending, the media guidance application may refrain from adjusting a recommendation of a different media asset based on increasing a weighting of Robin Williams.

In some embodiments, the media guidance application may determine that another respective attribute of the plurality of attributes matches another topic of the plurality of topics. For example, if the viewed media asset is Good Will Hunting, the media guidance application may determine that Matt Damon (an actor in Good Will Hunting) is also a trending topic.

In some embodiments, the media guidance application may update the set of weightings corresponding to the plurality of attributes by increasing a weighting corresponding to the other respective attribute. For example, the media guidance application may increase the weighting of Matt Damon from 5 to 7.

In some embodiments, the media guidance application may adjust the recommendation of the media asset different from the viewed media asset based on the increasing of the weighting of the respective attribute and the increasing of the weighting of the other respective attribute. For example, if the media guidance application did not have a recommendation for the user to watch the movie Happy Feet Two, if the media guidance application then determines that the user viewed Good Will Hunting and that Robin Williams and Matt Damon (actors in Good Will Hunting) are trending topics, the media guidance application may recommend Happy Feet Two because it features both Robin Williams and Matt Damon as actors.

In some embodiments, the media guidance application may generate for display an indication for the user that the media asset different from the viewed media asset is recommended based on the topic. For example, if the user viewed Good Will Hunting following the death of Robin Williams (an actor in Good Will Hunting, and the media guidance application recommends the movie Dead Poets Society (in which Robin Williams also features) based on an increased weighting of Robin Williams for recommendation purposes, the media guidance application may generate for display the recommendation for Dead Poets Society along with text saying "This movie is recommended based on Robin Williams."

In some embodiments, the media guidance application may receive a command from the user not to increase the weighting corresponding to the respective attribute. For example, if the media guidance application generates for display a recommendation for the movie Dead Poets Society along with text saying "This movie is recommended based on Robin Williams," the media guidance application may also generate for display an option saying "Would you like to not recommend movies based on Robin Williams?" The media guidance application may receive the command as input signals transmitted to user equipment by a remote control used by the user to select a response, such as "Yes," in response to the option.

In some embodiments, the media guidance application may update the set of weightings corresponding to the plurality of attributes by decreasing the weighting corresponding to the respective attribute. For example, in response to a command from the user not to increase the weighting corresponding to Robin Williams, the media guidance application may decrease the weighting for Robin Williams from 10 to 5.

In some embodiments, the media guidance application may adjust the recommendation of the media asset different from the viewed media asset based on the updated set of weightings. For example, if the media guidance application previously recommended the media asset different from the viewed media asset based on an increased weighting of an attribute, upon decreasing that weighting, the media guidance application may no longer recommend the media asset different from the viewed media asset. For example, if the media guidance application previously recommended the movie Dead Poets Society based on the increased weighting of the attribute for Robin Williams (an actor in Dead Poets Society), upon decreasing the weighting of the attribute for Robin Williams, the media guidance application may no longer recommend Dead Poets Society.

In some embodiments, the media guidance application may adjust the recommendation of the media asset different from the viewed media asset based on weightings of attributes retrieved from a user profile. For example, if the viewed media asset is the movie Good Will Hunting and Robin Williams (an actor in Good Will Hunting) is trending, and the user profile includes a user preference for cartoons, the media guidance application may adjust a recommendation of the movie Aladdin, which is a cartoon featuring Robin Williams, based on both the increasing of the weighting of Robin Williams for being a trending topic, and based on the user preference in the user profile for cartoons.

In some embodiments, the media guidance application may receive a command from the user to adjust an amount by which the weighting corresponding to the respective attribute is increased. For example, the media guidance application may generate for display a number of options for adjusting the amount by which the weighting corresponding to the attribute that matches the trending topic is increased. For example, the options may be "Significantly," "Moderately," or "Not at all" (or any equivalents). For example, in response to selection of the "Significantly" option, the media guidance application may increase/multiply the weighting by 10, while in response to selection of the "Moderately" option, the media guidance application may increase/multiply the weighting by 5.

BRIEF DESCRIPTION OF THE DRAWINGS

FIG. 8 depicts pseudocode for a process implemented on control circuitry to search a database of trending topics for trending topics that match an attribute of a viewed media asset in accordance with some embodiments of the disclosure.

DETAILED DESCRIPTION OF THE DRAWINGS

Figure 1:
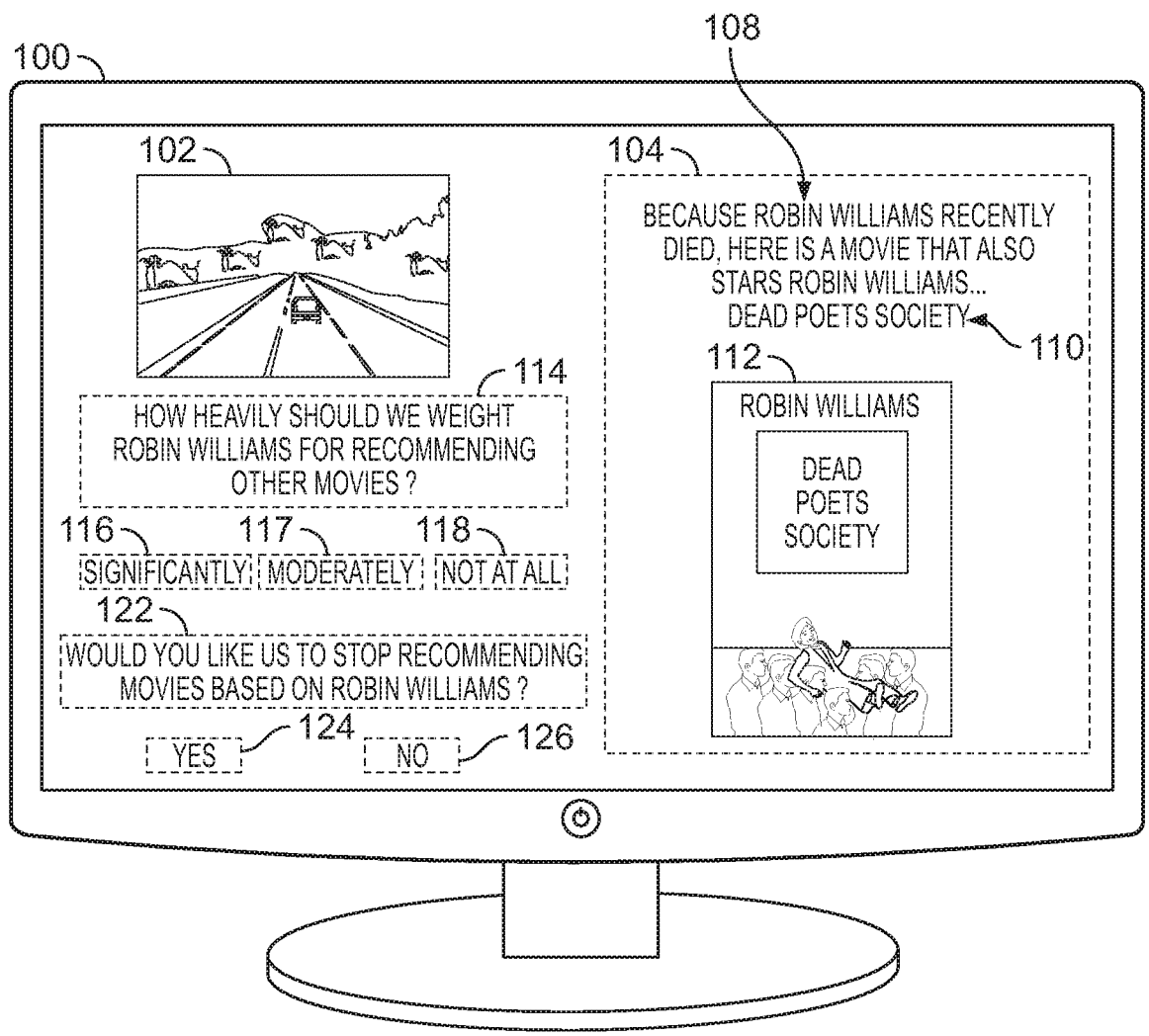
FIG. 1 depicts an illustrative embodiment of a media guidance application that flexibly uses trending topics as parameters for recommending media assets that are related to a viewed media asset, in accordance with some embodiments of the disclosure.

FIG. 1 depicts an illustrative embodiment of a media guidance application that flexibly uses trending topics as parameters for recommending media assets that are related to a viewed media asset, in accordance with some embodiments of the disclosure. User equipment 100 is depicted as a television, but may be any user equipment with any functionality described below with respect to FIGS. 2-5. User equipment 100 comprises control circuitry (also described further below with respect to FIGS. 2-5) that executes a media guidance application (which again is described further below with respect to FIGS. 2-5).

In some embodiments, the media guidance application may determine, based on processing input signals at user equipment 100, that a user has viewed or is currently viewing a media asset 102. For example, media asset 102 may be the movie Good Will Hunting. For example, the media guidance application may determine that the user has viewed media asset 102 based on processing input signals transmitted to user equipment 100 from user input interface 410 (described below with respect to FIGS. 2-5). For example, the input signals may be transmitted based on the user using user input interface 410 to select from the media guidance application a media asset identifier corresponding to media asset 102 for viewing. For example, the input signals may be transmitted based on the user using user input interface 410, such as an "Enter" or "OK" (or any equivalent) button on the remote control to select a "More Like This" (or equivalent) option from a user interface screen displaying information for media asset 102. The media guidance application may infer, based on this selection, that the user previously viewed media asset 102. For example, the input signals may be transmitted based on the user using a remote control, touchscreen (on a mobile phone, tablet, etc.), keyboard, mouse, game controller, etc.

In some embodiments, the media guidance application may determine that the user has viewed media asset 102 based on viewing history. For example, the viewing history may be associated with a user through a user profile, and may contain information indicating that the user viewed media asset 102 at a previous time.

In some embodiments, the media guidance application may identify a plurality of attributes corresponding to the viewed media asset 102. For example, the media guidance application may identify attributes regarding an actor, director, location, date of release, plot detail, and/or award of the viewed media asset. For example, if the media asset is the movie Good Will Hunting, the media guidance application may identify attributes such as Robin Williams, Matt Damon, Ben Affleck (actors in Good Will Hunting), Gus Van Sant (director of Good Will Hunting), Boston (location of Good Will Hunting), 1998 (year of release of Good Will Hunting), math (a plot detail in Good Will Hunting), and Academy Award for Best Actor (an award won by Good Will Hunting). In some embodiments, the media guidance application may identify the attributes based on metadata provided with viewed media asset 102 from media content source 516 and/or media guidance data source 518 (described below with respect to FIGS. 2-5). For example, the database may be a database for the website www.imdb.com, which provides entertainment information, or any similar database. In some embodiments, the media guidance application may identify the attributes by processing video frames of viewed media asset 102, such as by artificial intelligence and/or facial recognition. For example, the media guidance application may use facial recognition to recognize the actor Robin Williams in video frames of Good Will Hunting and thereby identify Robin Williams as an attribute of Good Will Hunting.

In some embodiments, the media guidance application may access a set of trending topics. For example, the set of trending topics may be determined based on determining that a threshold number of people (e.g., 10, 100, 1000, 10,000, 100,000 people, or any other suitable threshold number of people) have interacted with the topics in the set within a period of time that is shorter than a threshold period of time (e.g., 15 minutes, 30 minutes, one hour, two hours, five hours, 10 hours, one day, one week, or any other suitable period of time). For example, the trending topics may be determined by monitoring messages and posts on social networking services such as Twitter or Facebook, and determining that the threshold number of people have posted and/or viewed messages and/or posts regarding certain topics within the threshold period of time. For example, the trending topics may be determined by monitoring news articles and determining that the threshold number of people have viewed news articles regarding certain topics within the threshold period of time. For example, following the death of Robin Williams, Robin Williams may have been a trending topic based on the threshold number of people interacting with messages, posts, news articles, etc., regarding his death within the threshold period of time. For example, the trending topics may be determined by determining that a threshold number of news articles, social networking posts, e-mails, etc., have been written about the topics. The trending topics may be refreshed continuously or periodically (e.g., every 15 minutes, 30 minutes, one hour, two hours, five hours, 10 hours, one day, one week, or any other suitable period of time).

In some embodiments, the trending topics may be stored on a remote server and the media guidance application may access the trending topics (e.g., through communications network 514). In some embodiments, the media guidance application may determine the trending topics using similar methods as discussed above. In some embodiments, the media guidance application may retrieve the trending topics from a remote server and determine more trending topics with which to supplement the retrieved trending topics.

In some embodiments, the media guidance application may compare each of the attributes of viewed media asset 102 with the trending topics. In some embodiments, the media guidance application determines that an attribute of viewed media asset 102 matches a trending topic. For example, if viewed media asset 102 is Good Will Hunting, an attribute of viewed media asset 102 may be Robin Williams (an actor in Good Will Hunting). Furthermore, following the death of Robin Williams, Robin Williams may have been a trending topic. If the user views Good Will Hunting following the death of Robin Williams, the media guidance application may determine that the attribute Robin Williams of Good Will Hunting matches the trending topic Robin Williams.

In some embodiments, the media guidance application may determine and/or retrieve (e.g., from media content source 516 and/or media guidance data source 518) a smart tag that includes a unique identifier for an attribute of a media asset, where the smart tag is used to unambiguously associate the attributes and topics with entities to which they refer. The unique identifiers of the smart tags may be, for example, numeric sequences. For example, the unique identifier for the actor Robin Williams who stars in Good Will Hunting may be 0818. When the media guidance application compares the attributes of viewed media asset 102 to the trending topics, the media guidance application may compare the unique identifiers of the attributes with the unique identifiers of the trending topics. When the media guidance application determines that an attribute of viewed media asset 102 matches a trending topic, the media guidance application may determine that a unique identifier of the attribute matches a unique identifier of the trending topic. Comparing smart tags may help in situations where, for example, there are multiple individuals named Robin Williams. For example, the actor Robin Williams in Good Will Hunting may have a unique identifier of 0818, while another individual named Robin Williams may have a unique identifier of 0508 and is a trending topic. If a user has viewed Good Will Hunting, the media guidance application may not determine a match because the unique identifier of Robin Williams in Good Will Hunting does not match the unique identifier of the trending Robin Williams.

In some embodiments, the media guidance application may determine and/or retrieve (e.g., from media content source 516 and/or media guidance data source 518) corresponding weightings for attributes of a media asset. The weightings may be numerical values (e.g., 1, 100, etc.), levels expressed in non-numerical units (e.g., 5 stars, 4 thumbs-up, etc.), levels expressed in words (high, medium, etc.), or any other type of weighting. In some embodiments, the media guidance application may base a weighting of an attribute on the relevance of the attribute to the media asset. For example, if the media asset is the movie Good Will Hunting, and the attributes of the media asset are Robin Williams, Matt Damon, and Ben Affleck (actors in Good Will Hunting), the weightings of the attributes for Robin Williams and Matt Damon may be higher than the weighting of the attribute for Ben Affleck because Robin Williams and Matt Damon may be more relevant to Good Will Hunting than Ben Affleck (e.g., because Robin Williams and Matt Damon have larger roles in Good Will Hunting than Ben Affleck has). For example, the weighting of a location attribute in a first media asset may be greater than the weighting of a location attribute in a second media asset if the location in the first media asset is more relevant to the first media asset than the location in the second media asset. For example, the weighting of the attribute of Boston in Good Will Hunting may be greater than the weighting of the attribute of Los Angeles in 500 Days of Summer because Boston may be more important to Good Will Hunting than Los Angeles is to 500 Days of Summer.

In some embodiments, the media guidance application may determine or retrieve (e.g., from media content source 516 and/or media guidance data source 518) a weighting of a given attribute such that the weighting corresponds to viewers' estimated interest in the attribute. For example, the weighting of an actor in a media asset may be greater than the weighting of a director of the media asset because viewers may have more interest in actors than in directors. In some embodiments, the media guidance application may base a weighting of an attribute on how well-known the attribute is. For example, the weighting of an attribute of a well-known actor in a media asset may be greater than the weighting of an attribute of a less well-known actor in the media asset, even if the two actors have similarly sized roles in the media asset. The media guidance application may determine viewers' estimated interest in an attribute or how well-known an attribute is by retrieving (e.g., from media content source 516 and/or media guidance data source 518) aggregations of profile data, ratings, and/or user interactions from multiple viewers. In some embodiments, weightings of attributes are determined based on a plurality of factors. For example, the media guidance application may base a weighting of an actor attribute both on how relevant the actor is to the media asset and how well-known the actor is. For example, the media guidance application may calculate a weighting as an average of a weighting of the actor's relevance to the media asset and a weighting of how well-known the actor is.

In some embodiments, the media guidance application may use weightings of viewed media asset 102 for recommendation purposes. In some embodiments, the media guidance application may recommend candidate media assets to the user based on weightings of attributes of viewed media asset 102 and weightings of attributes of the candidate media assets. For example, the media guidance application may recommend candidate media assets that share attributes of viewed media asset 102. Candidate media assets that have large weightings for attributes that also have large weightings in viewed media asset 102 may be recommended more highly in a ranking of recommended media assets. For example, if a candidate media asset shares a number of attributes with viewed media asset 102, but those attributes have low weightings in viewed media asset 102, and the candidate media asset does not share an attribute that has a high weighting in viewed media asset 102, the candidate media asset may not be recommended, or may be recommended lower in a ranking of recommended media assets.

In some embodiments, the media guidance application may recommend candidate media assets based on calculations of dot products of the weightings of attributes of viewed media asset 102 and the weightings of the same attributes of candidate media assets. For example, weightings for attributes of the actors Robin Williams, Matt Damon, and Ben Affleck in Good Will Hunting (viewed media asset 102 in this example) may be 5, 5, and 1, respectively. Weightings for attributes of the actors Robin Williams, Matt Damon, and Ben Affleck in the movie Happy Feet Two (the candidate media asset in this example) may be 1, 5, and 0. (The weighting for the attribute of Ben Affleck in Happy Feet Two may be 0 because Ben Affleck does not appear in Happy Feet Two.) The media guidance application may calculate the dot product by multiplying the two weightings for Robin Williams in each movie, multiplying the two weightings for Matt Damon in each movie, multiplying the two weightings for Ben Affleck in each movie, and adding the results. For example, given the aforementioned weightings, the media guidance application may calculate the dot product as 5*1+5*5+1*0=30. The media guidance application may recommend a media asset if the calculated dot product exceeds a threshold. For example, if the threshold is 32, and the calculated dot product between Good Will Hunting and Happy Feet Two is 30, the media guidance application may not recommend Happy Feet Two.

In some embodiments, the media guidance application may update a set of weightings corresponding to viewed media asset 102. Updating the set of weightings may include increasing a weighting corresponding to an attribute that matches a trending topic for recommendation purposes. For example, if the media asset is Good Will Hunting and the matching attribute is Robin Williams, the media guidance application may increase the weighting of Robin Williams for recommendation purposes. For example, if the attributes of Good Will Hunting are Robin Williams, Matt Damon, and Ben Affleck, weightings of these attributes may be 5, 5, and 1, respectively. If the media guidance application determines that Robin Williams is a trending topic, the weighting of 5 for Robin Williams may be increased, for example to 10, while the weighting of 5 for Matt Damon and the weighting of 1 for Ben Affleck may remain the same. The weighting of the attribute that matches the trending topic may only be increased for recommendation purposes. For example, the weighting may be increased in a data structure used by the media guidance application for recommendation. If the weighting of the attribute is also in a data structure associated with viewed media asset 102, the weighting may not be increased in that data structure because the default weighting may be necessary for other operations (e.g., operations not related to recommendation).

The media guidance application may increase the weighting of the attribute that matches the trending topic according to any method. In some embodiments, the media guidance application may increase the weighting by a default amount. In some embodiments, the media guidance application may increase the weighting by an amount corresponding to a number of people who have interacted with the trending topic within the period of time. In some embodiments, the media guidance application may increase the weighting by an amount equal to the number of people. For example, if 100 people have interacted with the trending topic within the period of time, the media guidance application may increase the weighting by 100. In some embodiments, the media guidance application may increase the weighting by an amount proportional to the number of people. For example, if a constant of proportionality of 100 is used, and the number of people is 1000, the media guidance application may increase the weighting by 10 (i.e., 1000/100). In some embodiments, the media guidance application may multiply the weighting by an amount proportional to the number of people. For example, if a constant of proportionality of 100 is used, and the number of people is 1000, the media guidance application may multiply the weighting by 10 (i.e., 1000/100). In some embodiments, the media guidance application may use a tier method for increasing the weighting. For example, if the number of people is in a first tier, the media guidance application may increase and/or multiply the weighting by a first amount. If the number of people is in a second tier, the media guidance application may increase and/or multiply the weighting by a second amount, etc. For example, if the number of people is between 100 and 1000 (the first tier of this example), the media guidance application may increase/multiply the weighting by 5, while if the number of people is between 1000 and 10,000 (the second tier of this example), the media guidance application may increase/multiply the weighting by 10.

In some embodiments, the media guidance application may receive a command from the user to adjust an amount by which the weighting corresponding to the attribute that matches the trending topic is increased. For example, the media guidance application may generate for display a number of options 116-118 for adjusting the amount by which the weighting corresponding to the attribute that matches the trending topic is increased, along with text 114 saying, for example, "How heavily should we weight Robin Williams for recommending other movies?" or any equivalent. For example, options 116-118 may include "Significantly," "Moderately," or "Not at all" (or any equivalents). If, for example, the media guidance application receives a command from the user selecting option 116 of "Significantly," the media guidance application may increase the weighting by a larger amount than if the media guidance application receives a command from the user selecting option 117 of "Moderately." For example, in response to selection of option 116 ("Significantly"), the media guidance application may increase/multiply the weighting by 10, while in response to selection of option 117 ("Moderately"), the media guidance application may increase/multiply the weighting by 5. If the media guidance application receives a command from the user selecting option 118 ("Not at all"), the media guidance application may not increase the weighting, or it may decrease the weighting below a previous value or a default value.

In some embodiments, the media guidance application may adjust a recommendation for a media asset that is different from viewed media asset 102 based on the updated set of weightings. For example, based on the increasing of the weighting of the attribute that matches the trending topic in the updated set of weightings, the media guidance application may no longer recommend candidate media assets that were previously recommended if they do not have high weightings for the attribute. For example, if the media guidance application had a recommendation for the user to watch the movie Spotlight, if the media guidance application then determines that the user viewed Good Will Hunting and that Robin Williams (an actor in Good Will Hunting) is a trending topic, the media guidance application may no longer recommend Spotlight because it does not feature Robin Williams. For example, if the media guidance application did not have a recommendation for the user to watch Dead Poets Society, if the media guidance application then determines that the user viewed Good Will Hunting and that Robin Williams is a trending topic, the media guidance application may recommend Dead Poets Society because it features Robin Williams.

For example, based on the increasing of the weighting, the media guidance application may calculate a new dot product between the weightings of viewed media asset 102 and other media assets that are candidates for recommendation. For example, the media guidance application may have originally calculated the dot product between Good Will Hunting and Happy Feet Two as 30, as discussed above. However, if the media guidance application increases the weighting of Robin Williams in Good Will Hunting from 5 to 10 for recommendation purposes, the media guidance may recalculate the dot product between Good Will Hunting and Happy Feet Two. For example, if the updated weightings of the actors Robin Williams, Matt Damon, and Ben Affleck in Good Will Hunting are 10, 5, and 1 for recommendation purposes, and the weightings of the actors Robin Williams, Matt Damon, and Ben Affleck in Happy Feet Two are 1, 5, and 0, the media guidance application may calculate the dot product as $10*1+5*5+1*0=35$. In some embodiments, the media guidance application may determine that the dot product exceeds a threshold. For example, if the threshold is 32, the media guidance application may determine that the dot product exceeds the threshold (whereas prior to the increasing of the weighting for Robin Williams, the recommendation score may not have exceeded the threshold). The media guidance application may therefore adjust its recommendation of Happy Feet Two to recommend it to the user rather than not recommending it.

In some embodiments, the media guidance application may determine that another attribute of viewed media asset 102 matches a trending topic. For example, if viewed media asset 102 is Good Will Hunting, the media guidance application may determine that both Robin Williams and Matt Damon (actors in Good Will Hunting) are trending topics. In some embodiments, the media guidance application may update a set of weightings corresponding to viewed media asset 102 by increasing weightings corresponding to both attributes that match the trending topics for recommendation purposes. For example, if both Robin Williams and Matt Damon are trending topics, the media guidance application may increase weightings corresponding to both Robin Williams and Matt Damon.

The media guidance application may increase the weightings of the attributes that match the trending topic according to any method. In some embodiments, the media guidance application may increase the weightings by a default amount. In some embodiments, the media guidance application may increase the weightings of each attribute by different amounts. For example, the media guidance application may increase the weighting of each attribute by an amount corresponding to a number of people who have interacted with each corresponding trending topic within the period of time. For example, if 100 people have interacted with the trending topic of Robin Williams within the period of time, and 50 people have interacted with the trending topic of Matt Damon within the period of time, the media guidance application may increase the weighting of the Robin Williams attribute by an amount corresponding to 100 and increase the weighting of the Matt Damon attribute by an amount corresponding to 50. For example, the media guidance application may increase the weighting of the Robin Williams attribute by 100 and increase the weighting of the Matt Damon attribute 50. For example, if a constant of proportionality of 10 is used, the media guidance application may increase/multiply the weighting of the Robin Williams attribute by 10 (i.e., 100/10) and increase the weighting of the Matt Damon attribute by 5 (i.e., 50/10).

In some embodiments, the media guidance application may adjust a recommendation of a media asset different from viewed media asset 102 based on the increased weightings of both attributes. For example, the media guidance applications may recommend a media asset different from viewed media asset 102 based on the increased weightings of both Robin Williams and Matt Damon. For example, if the media guidance application had a recommendation for the user to watch the movie Spotlight, if the media guidance application then determines that the user viewed Good Will Hunting and that Robin Williams and Matt Damon (actors in Good Will Hunting) are trending topics, the media guidance application may no longer recommend Spotlight because it does not feature Robin Williams or Matt Damon. For example, if the media guidance application did not have a recommendation for the user to watch the movie Happy Feet Two, if the media guidance application then determines that the user viewed Good Will Hunting and that Robin Williams and Matt Damon were trending topics, the media guidance application may recommend Happy Feet Two because it features both Robin Williams and Matt Damon. In some embodiments, the media guidance application may adjust a recommendation of a media asset different from viewed media asset 102 based on the increased weightings of either attribute. For example, if the media guidance application did not have a recommendation for the user to watch the movies Dead Poets Society or The Martian, if the media guidance application then determines that the user viewed Good Will Hunting and that Robin Williams and Matt Damon are trending topics, the media guidance application may recommend either or both of Dead Poets Society and The Martian because Dead Poets Society features Robin Williams and The Martian features Matt Damon.

For example, based on the increasing of the weightings, the calculated dot product between the weightings of the viewed media asset and the other media assets that are candidates for recommendation may change. For example, the original dot product between Good Will Hunting and Happy Feet Two may be 30. However, if the media guidance application increases the weighting of Robin Williams in Good Will Hunting from 5 to 10 and increases the weighting of Matt Damon from 5 to 7, the media guidance application may recalculate the dot product between Good Will Hunting and Happy Feet Two. For example, if the updated weightings of Robin Williams, Matt Damon, and Ben Affleck in Good Will Hunting are 10, 7, and 1 for recommendation purposes, and the weightings of Robin Williams, Matt Damon, and Ben Affleck in Happy Feet Two are 1, 5, and 0, the media guidance application may calculate the dot product as 10*1+7*5+1*0=45. In some embodiments, the media guidance application may determine that the dot product exceeds a threshold. For example, if the threshold is 40, the media guidance application may determine that the recommendation score exceeds the threshold (whereas prior to the increasing of the weightings for Robin Williams and Matt Damon, the recommendation score may not have exceeded the threshold). The media guidance application may therefore adjust its recommendation of Happy Feet Two to recommend it to the user rather than not recommending it.

In some embodiments, the media guidance application may generate for display the recommendation 104 of the media asset that has been adjusted. In some embodiments, recommendation 104 may be generated for display on a display screen of user equipment 100. For example, recommendation 104 may include a media asset identifier 110 and/or an image 112 for the recommended media asset along with text saying "Recommended Movies," "We Recommend These Movies," "Recommended for You," or any equivalent. In some embodiments, the media guidance application generates for display recommendation 104 at the conclusion of the user's viewing of the media asset 102 (e.g., as the credits roll).

Recommending a media asset based on a trending topic corresponding to viewed media asset 102 may be helpful because the user may have viewed media asset 102 because of the trending topic. By determining attributes corresponding to viewed media asset 102, and determining whether any of the attributes match a trending topic, the media guidance application may be able to determine why the user viewed media asset 102 and account for that information in order to recommend other media assets that conform to the user's current preferences. For example, following the death of Robin Williams (when Robin Williams was a trending topic), if the user viewed Good Will Hunting (in which Robin Williams starred), there is a significant probability that the user viewed Good Will Hunting because of the death of Robin Williams. By increasing the weighting of Robin Williams for recommendation of other media assets, the media guidance application may be able to recommend media assets to the user that conform to the user's current preference for Robin Williams.

In some embodiments, the media guidance application may generate for display an indication for the user that the media asset different from viewed media asset 102 is recommended based on the trending topic. For example, if the user viewed Good Will Hunting following the death of Robin Williams (an actor in Good Will Hunting), and the media guidance application recommended Dead Poets Society (in which Robin Williams also starred) based on an increased weighting of Robin Williams for recommendation purposes, the media guidance application may generate for display the recommendation for Dead Poets Society along with text 108 saying "This movie is recommended based on Robin Williams," "Because Robin Williams recently died, here is a movie that also stars Robin Williams," or any equivalent.

In some embodiments, the media guidance application may receive a command from the user not to increase a weighting corresponding to an attribute of viewed media asset 102 that matches a trending topic. For example, if the media guidance application generates for display a recommendation for Dead Poets Society along with text 108 saying "Because Robin Williams recently died, here is a movie that also stars Robin Williams," the media guidance application may also generate for display text 122 saying "Would you like us to stop recommending movies based on Robin Williams?" or any equivalent, along with response options 124 ("Yes") and 126 ("No"). The media guidance application may receive the command as input signals transmitted to user equipment 100 by a remote control. For example, the user may use buttons on the remote control to select option 124 ("Yes") from the media guidance application in response to text 122. In some embodiments, the media guidance application may update a set of weightings corresponding to viewed media asset 102. Updating the set of weightings may include decreasing a weighting corresponding to the attribute that the user indicated should not be increased for recommendation purposes. For example, the attribute of Robin Williams may have had a default value of 5. If the media guidance application determined that Robin Williams is a trending topic, the media guidance application may have increased the weighting of 5 for Robin Williams, for example to 10. In response to a command from the user not to increase the weighting corresponding to Robin Williams, for example by selection of option 124 ("Yes"), the media guidance application may decrease the weighting for Robin Williams from 10 to another value. In some embodiments, the weighting may be decreased to the default value, in this example 5. In some embodiments, the weighting may be decreased below the default value. In some embodiments, the weighting may be decreased to zero. In some embodiments, the weighting may be decreased by an amount based on further input for the user.

In some embodiments, the media guidance application may adjust the recommendation of the media asset different from viewed media asset 102 based on the updated set of weightings. For example, if the media guidance application previously recommended the media asset different from viewed media asset 102 based on an increased weighting of an attribute, upon decreasing that weighting, the media guidance application may no longer recommend the media asset different from viewed media asset 102. For example, if the user viewed the movie Good Will Hunting following the death of Robin Williams (an actor in Good Will Hunting), and the media guidance application recommended the movie Dead Poets Society (in which Robin Williams also starred) based on an increased weighting of Robin Williams for recommendation purposes, after decreasing the weighting of Robin Williams based on the user's command, the media guidance application may no longer recommend Dead Poets Society. For example, if the media guidance application had a recommendation for the user to watch the movie Spotlight, and the media guidance application then determined that the user viewed Good Will Hunting and that Robin Williams was a trending topic, the media guidance application may have increased a weighting of Robin Williams for recommendation purposes and refrained from recommending Spotlight because it does not feature Robin Williams. After decreasing the weighting of Robin Williams based on the command from the user, the media guidance application may recommend Spotlight again.

In some embodiments, the media guidance application may further adjust the recommendation of the media asset different from viewed media asset 102 based on weightings of attributes retrieved from a user profile. For example, if viewed media asset 102 is the movie Good Will Hunting and Robin Williams (an actor in Good Will Hunting) is trending, and the user profile includes a user preference for cartoons, the media guidance application may adjust a recommendation of the movie Aladdin, which is a cartoon featuring Robin Williams, based on both the increasing of the weighting of Robin Williams for being a trending topic, and based on the user preference in the user profile for cartoons. For example, if the media guidance application would not recommend Aladdin just based on increasing the weighting of Robin Williams, the media guidance application may recommend Aladdin based on both the increasing of the weighting of Robin Williams for being a trending topic and based on the user preference in the user profile for cartoons.

In some embodiments, the attributes stored in the user profile are manually added to the user profile by the user. In some embodiments, the media guidance application may add attributes to the user profile based on responses from the user to questions posed by the media guidance application. For example, the media guidance application may pose a question to the user such as "Do you have a preference for movies set in a specific location?" and receive "Boston" as a response from the user. In some embodiments, the media guidance application may add attributes to the user profile based on the viewing history of the user. For example, if the user has watched The Departed, Gone Baby Gone, The Town, Spotlight, and The Fighter (all of which are set in Boston), the media guidance application may add Boston to the user profile.

In some embodiments, the media guidance application may receive a search request from the user. The media guidance application may receive the search request as input signals transmitted to user equipment 100 by a remote control. For example, the user may use buttons on the remote control to input a search request through the media guidance application. For example, the search request may be a search request for a media asset identifier, such as "Good". For example, the search request may be a search request for media assets having an attribute. For example, the search request may be for media assets having "Robin Williams" as an actor. The search request may be performed through typing with a keyboard, through typing by selecting letters shown on a display screen, through a voice command, through selecting search terms with a mouse, keyboard, or touchscreen, or through any suitable means of entering a search.

In some embodiments, the media guidance application may, in response to receiving the search request, generate for display media asset identifiers corresponding to results of a search performed based on the search request. For example, if the search request is "Good", a search may be performed for media assets with media asset identifiers (e.g., titles) containing "Good", and the media guidance application may generate for display the media asset identifiers found as a result of the search. For example, the media guidance application may generate for display "Good Will Hunting" and "Goodfellas" based on the search request for "Good." For example, if the search request is "Robin Williams", a search may be performed for media assets featuring Robin Williams, and the media guidance application may generate for display media asset identifiers corresponding to the media assets found as a result of the search. For example, the media guidance application may generate for display Good Will Hunting, Mrs. Doubtfire, and Dead Poets Society.

In some embodiments, the media guidance application may receive a selection from the user of a media asset identifier from the media asset identifiers that were generated for display. The selection may be received through input signals transmitted to user equipment 100 from a remote control. For example, the user may use buttons on the remote control to select a media asset identifier displayed by the media guidance application. The media asset identifier selected by the user may correspond to viewed media asset 102, and the user may use the search request in order to access media asset 102 for viewing. In some embodiments, the media guidance application may conditionally adjust the recommendation of the media asset different from viewed media asset 102 (as discussed above) upon a condition in which the user used the search request in order to access media asset 102 for viewing. In some embodiments, the media guidance application may refrain from adjusting the recommendation of the media asset different from viewed media asset 102 when this condition is not met.

Adjusting the recommendation of the media asset different from viewed media asset 102 upon a condition in which the user used the search request in order to access media asset 102 for viewing, and not adjusting the recommendation of the media asset different from viewed media asset 102 upon a condition in which this condition is not met, may be helpful in determining whether the user purposefully sought to view media asset 102. If the user used a search request to access media asset 102 for viewing, this is an indication that the user purposefully sought to view media asset 102. If the user purposefully sought to view media asset 102, and an attribute of viewed media asset 102 matches a trending topic, there is a significant probability that the user viewed media asset 102 because of the trending topic. If the user viewed media asset 102 because of the trending topic, it may be helpful to increase the weighting of the attribute corresponding to the trending topic in order to adjust the recommendation of a different media asset. For example, if the user used a search request such as "Good" or "Robin Williams" in order to access the movie Good Will Hunting (in which Robin Williams starred) for viewing following the death of Robin Williams (when Robin Williams was a trending topic), there is a significant probability that the user purposefully viewed Good Will Hunting because of the death of Robin Williams. By increasing the weighting of Robin Williams for recommendation of other media assets, the media guidance application may be able to recommend media assets to the user that conform to the user's current preference for Robin Williams.

However, if the user did not use a search request in order to access media asset 102 for viewing (e.g., the user happened upon viewed media asset 102 while flipping through channels, or was presented with the option to view media asset 102 on a home screen), this is an indication that the user did not purposefully seek to view media asset 102. If the user did not purposefully seek to view media asset 102, there is a significant probability that the user did not view media asset 102 because of the attribute of viewed media asset 102 that matches the trending topic. If the user did not view media asset 102 because of the trending topic, it may not be helpful to increase the weighting of the attribute corresponding to the trending topic in order to adjust the recommendation of a different media asset. For example, if the user happened upon Good Will Hunting (in which Robin Williams starred) while flipping through channels following the death of Robin Williams, there is a significant probability that the user did not view Good Will Hunting because of the death of Robin Williams. Instead, the user may have viewed Good Will Hunting because of another attribute of Good Will Hunting, such as Matt Damon (another actor in Good Will Hunting), or simply because the user happened upon it. In such a situation, increasing the weighting of Robin Williams for recommendation of other media assets may not be helpful, because media assets recommended based on increasing the weighting of Robin Williams may emphasize Robin Williams to a degree that is out of proportion to the user's current preference for Robin Williams.

In some embodiments, the media guidance application may receive a search request from the user for media assets having an attribute. In some embodiments, the media guidance application may determine that the attribute in the search request does not match a trending topic. For example, the search request from the user may be for media assets having Matt Damon as an actor. The media guidance application may determine that Matt Damon is not a trending topic. In some embodiments, based on determining that the attribute in the search request does not match a trending topic, the media guidance application may refrain from adjusting a recommendation of a media asset different from viewed media asset 102. For example, if the search request from the user was for media assets having Matt Damon as an actor, and the user accessed the movie Good Will Hunting (in which Matt Damon starred) based on this search request, even if another attribute of Good Will Hunting such as Robin Williams (another actor in Good Will Hunting) is trending, the media guidance application may refrain from adjusting a recommendation of a different media asset based on increasing a weighting of Robin Williams. Because the user used a search request for Matt Damon in order to access Good Will Hunting, there is a significant probability that the user viewed Good Will Hunting because of Matt Damon, rather than because Robin Williams is a trending topic. In such a situation, increasing the weighting of Robin Williams for recommendation of other media assets may not be helpful, because media assets recommended based on increasing of the weighting of Robin Williams may emphasize Robin Williams to a degree that is out of proportion to the user's current preference for Robin Williams.

In some embodiments, the media guidance application may perform the steps described for attributes retrieved from the user profile. For example, upon start-up of a media guidance application by a user, the media guidance application may retrieve an attribute from the user profile, determine whether the attribute matches a trending topic, update a set of weightings by increasing a weighting associated with the attribute that matches the trending topic, adjust a recommendation for a media asset based on the updated set of weightings, and generate for display the recommendation of the media asset, as discussed above. The adjusting of the recommendation may be performed without the user viewing a media asset having the attribute matching the trending topic.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
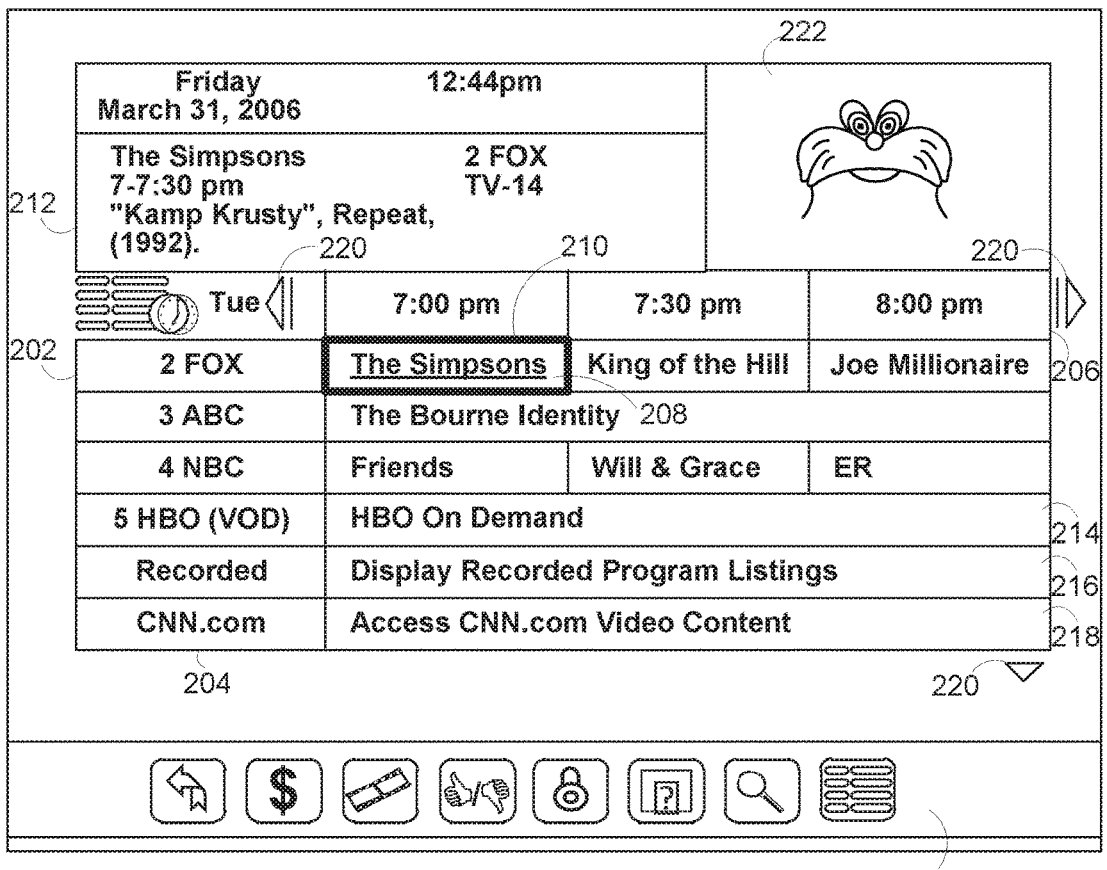
FIG. 2 shows an illustrative embodiment of a display screen that may be used to provide media guidance application listings and other media guidance information, in accordance with some embodiments of the disclosure.
Figure 3:
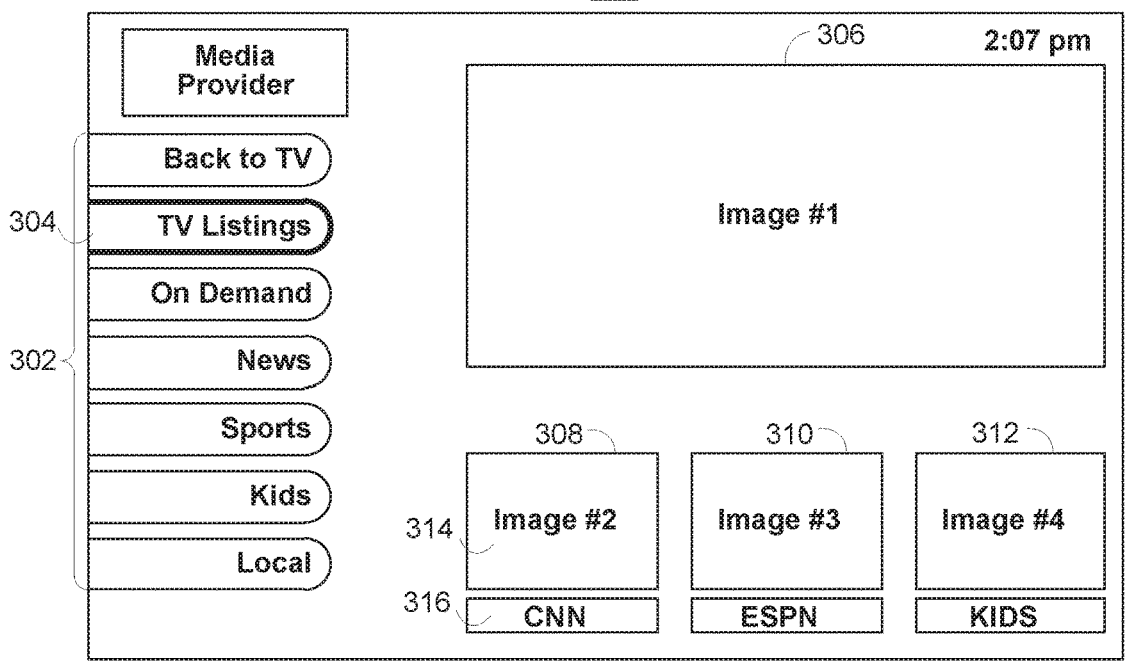
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/

0153885, filed Nov. 12, 2009, which is hereby incorporated by reference herein in its entirety.

Figure 4:
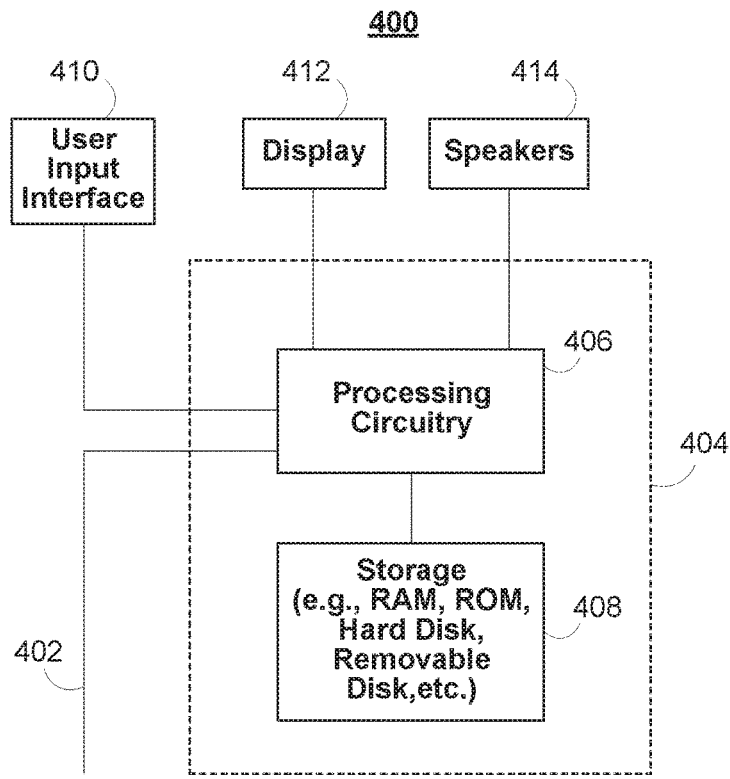
FIG. 4 is a block diagram of an illustrative user equipment (UE) device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
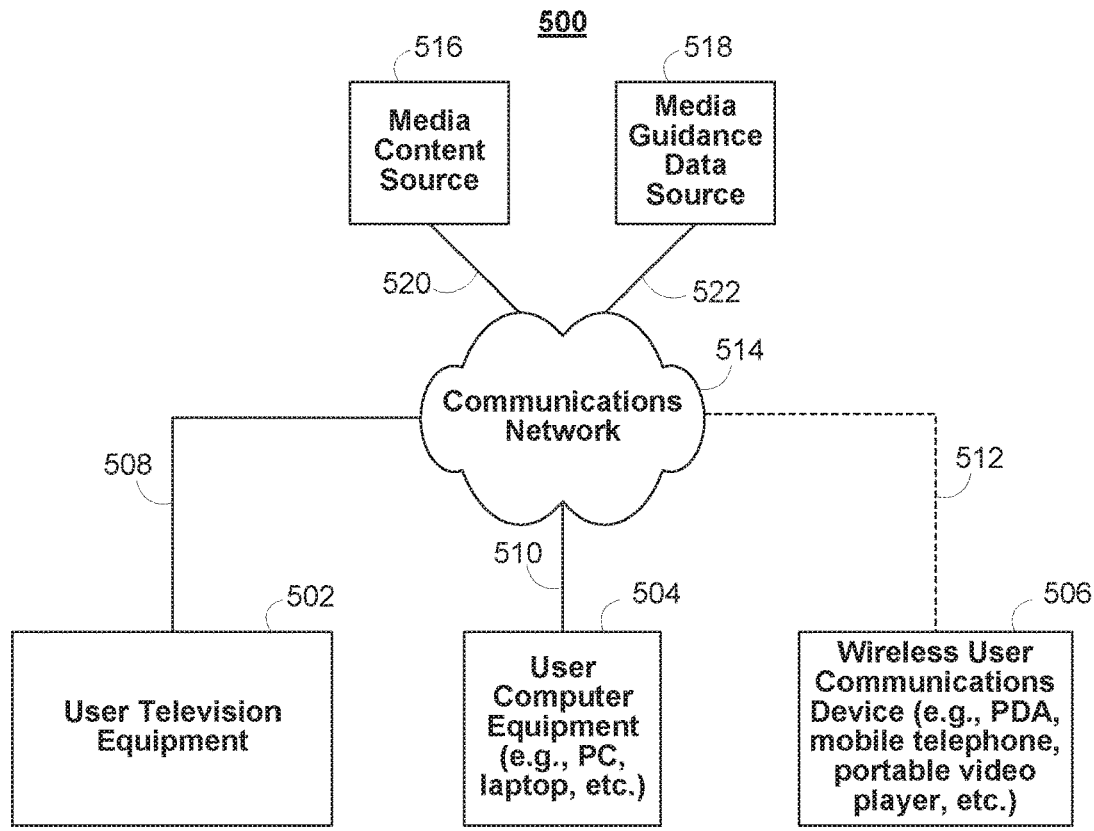
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a web site via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
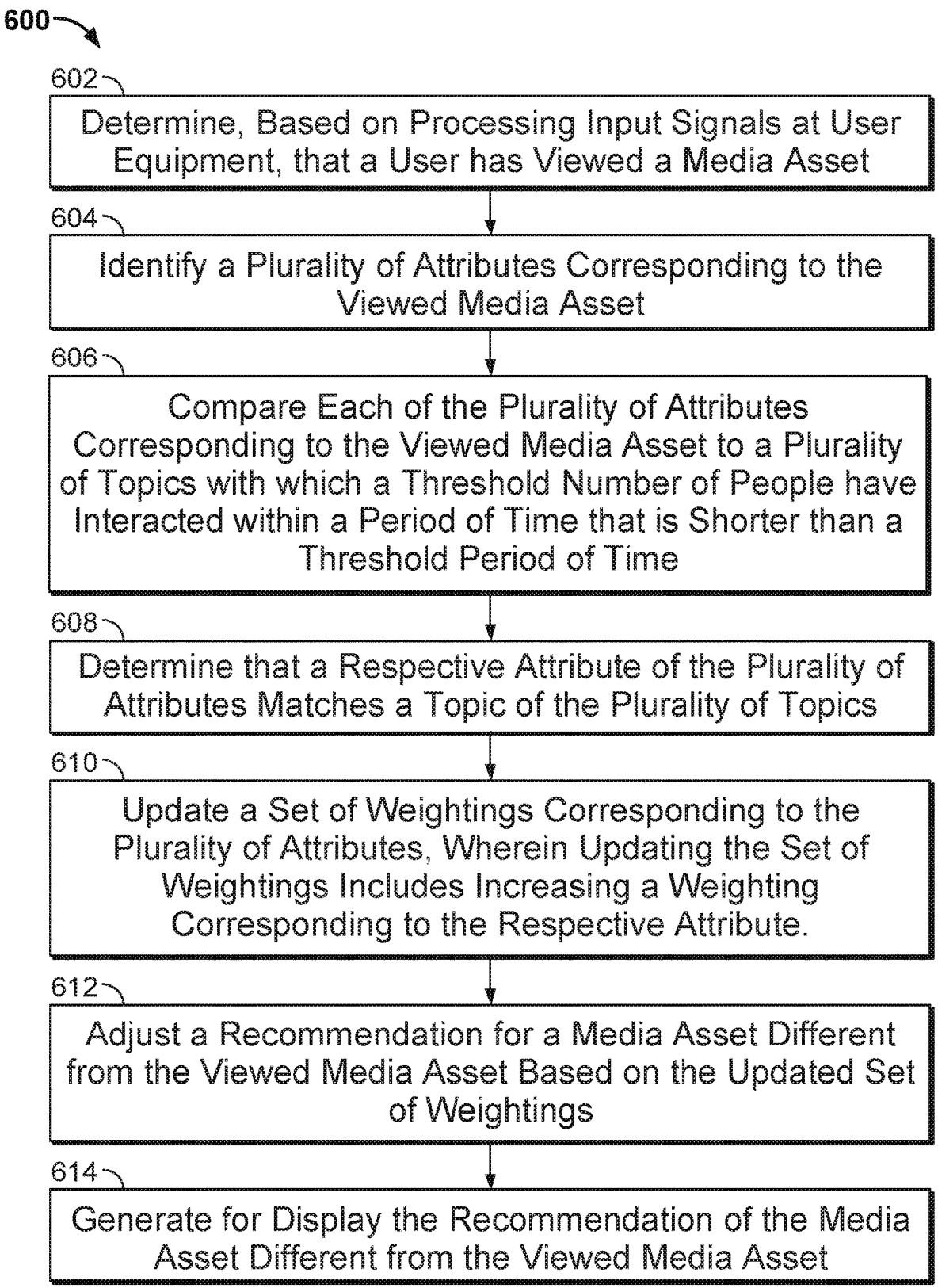
FIG. 6 depicts an illustrative flowchart of a process for flexibly using trending topics as parameters for recommending media assets that are related to a viewed media asset in accordance with some embodiments of the disclosure.

FIG. 6 depicts an illustrative flowchart of a process 600 for flexibly using trending topics as parameters for recommending media assets that are related to a viewed media asset in accordance with some embodiments of the disclosure. A media guidance application causes control circuitry 404 of user equipment (e.g., user equipment 100, user equipment 400, user television equipment 502, user computer equipment 504, or wireless user communications device 506) to execute each of the elements of FIG. 6. Process 600 begins at 602, where control circuitry 404 determines, based on processing input signals at the user equipment, that a user has viewed media asset 102. For example, control circuitry 404 may determine that the user has viewed media asset 102 based on processing input signals transmitted to the from user input interface 410.

Process 600 continues to 604, where control circuitry 404 may identify a plurality of attributes corresponding to viewed media asset 102. For example, the media guidance application may identify attributes regarding an actor, director, location, date of release, plot detail, and/or award of the viewed media asset. Control circuitry 404 may retrieve the trending topics from storage 408, or from media content source 516 and/or media guidance data source 518 through communications network 514.

Process 600 continues to 606, where control circuitry 404 may compare each of the plurality of attributes corresponding to viewed media asset 102 to a plurality of topics with which a threshold number of people have interacted within a period of time that is shorter than a threshold period of time. For example, the trending topics may be determined by monitoring messages and posts on Twitter, Facebook, or other social networking services, and determining that the threshold number of people have posted and/or viewed messages and/or posts regarding certain topics within the threshold period of time. For example, the trending topics may be determined by monitoring news articles and determining that the threshold number of people have viewed news articles regarding certain topics within the threshold period of time. The threshold number of people may be, for example, 10, 100, 1000, 10,000, 100,000 people, or any other suitable threshold number of people. The threshold period of time may be, for example, 15 minutes, 30 minutes, one hour, two hours, five hours, 10 hours, one day, one week, or any other suitable period of time. Control circuitry 404 may retrieve the trending topics from a database at media content source 516 and/or media guidance data source 518, through communications network 514.

Process 600 continues to 608, where control circuitry 404 may determine that a respective attribute of the plurality of attributes matches a topic of the plurality of topics. For example, if viewed media asset 102 is Good Will Hunting, an attribute of viewed media asset 102 may be Robin Williams (an actor in Good Will Hunting). Following the death of Robin Williams, Robin Williams may have been a trending topic. If the user views Good Will Hunting following the death of Robin Williams, control circuitry 404 may determine that the attribute Robin Williams of Good Will Hunting matches the trending topic Robin Williams.

Process 600 continues to 610, where control circuitry 404 may update a set of weightings corresponding to the plurality of attributes, wherein updating the set of weightings includes increasing a weighting corresponding to the respective attribute. For example, if viewed media asset 102 is Good Will Hunting and the matching attribute is Robin Williams (an actor in Good Will Hunting), control circuitry 404 may increase the weighting of the attribute of Robin Williams. For example, if the weighting associated with the attribute of Robin Williams is 5, control circuitry 404 may increase the weighting to 10. At 610, control circuitry 410 may receive a command from the user through user input interface 410 to adjust an amount by which the weighting corresponding to the attribute that matches the trending topic is increased. For example, the media guidance application may generate for display on display 412 a number of options 116-118 for adjusting the amount by which the weighting corresponding to the attribute that matches the trending topic is increased, along with text 114 saying, for example, "How heavily should we weight Robin Williams for recommending other movies?" or any equivalent. For example, options 116-118 may include "Significantly," "Moderately," or "Not at all" (or any equivalents).

Process 600 continues to 612, where control circuitry 404 may adjust a recommendation for a media asset different from viewed media asset 102 based on the updated set of weightings. For example, if control circuitry 404 did not have a recommendation for the user to watch the movie Dead Poets Society, if control circuitry 404 then determines that the user viewed Good Will Hunting and that Robin Williams (an actor in Good Will Hunting) is a trending topic, control circuitry 404 may increase the weighting for the Robin Williams attribute and recommend Dead Poets Society because it features Robin Williams. At 612, control circuitry 404 may receive a command from the user not to increase a weighting corresponding to an attribute of viewed media asset 102 that matches a trending topic. For example, if the media guidance application generates for display a recommendation for Dead Poets Society along with text saying "This movie is recommended based on Robin Williams," the media guidance application may also generate for display, on display 412, text 122 saying "Would you like us to stop recommending movies based on Robin Williams?" or any equivalent, along with response options 124 ("Yes") and 126 ("No").

Process 600 continues to 614, where control circuitry 404 may generate for display the recommendation 104 of the media asset that has been adjusted. In some embodiments, recommendation 104 may be generated for display on display 412. For example, recommendation 104 may include a media asset identifier 110 and/or an image 112 for the recommended media asset along with text saying "Recommended Movies," "We Recommend These Movies," "Recommended for You," or any equivalent. In some embodiments, the media guidance application generates for display recommendation 104 at the conclusion of the user's viewing of the media asset 102 (e.g., as the credits roll). At 614, control circuitry 614 may generate for display an indication for the user that the media asset different from viewed media asset 102 is recommended based on the trending topic. For example, if the user viewed Good Will Hunting (in which Robin Williams starred) following the death of Robin Williams, and the media guidance application recommended Dead Poets Society (in which Robin Williams also starred) based on an increased weighting of Robin Williams for recommendation purposes, the media guidance application may generate for display the recommendation for Dead Poets Society along with text 108 saying "This movie is recommended based on Robin Williams," "Because Robin Williams recently died, here is a movie that also stars Robin Williams," or any equivalent.

It should be noted that process 600 or any step thereof could be performed on, or provided by, any of the devices shown in FIGS. 1 and 4-5. For example, process 600 may be executed by control circuitry 404 (FIG. 4) as instructed by control circuitry implemented on user equipment 502, 504, 506 (FIG. 5), and/or user equipment, in order to flexibly use trending topics as parameters for recommending media assets that are related to a viewed media asset. In addition, process 600 may be incorporated into or combined with one or more steps of any other process or embodiment.

Figure 7:
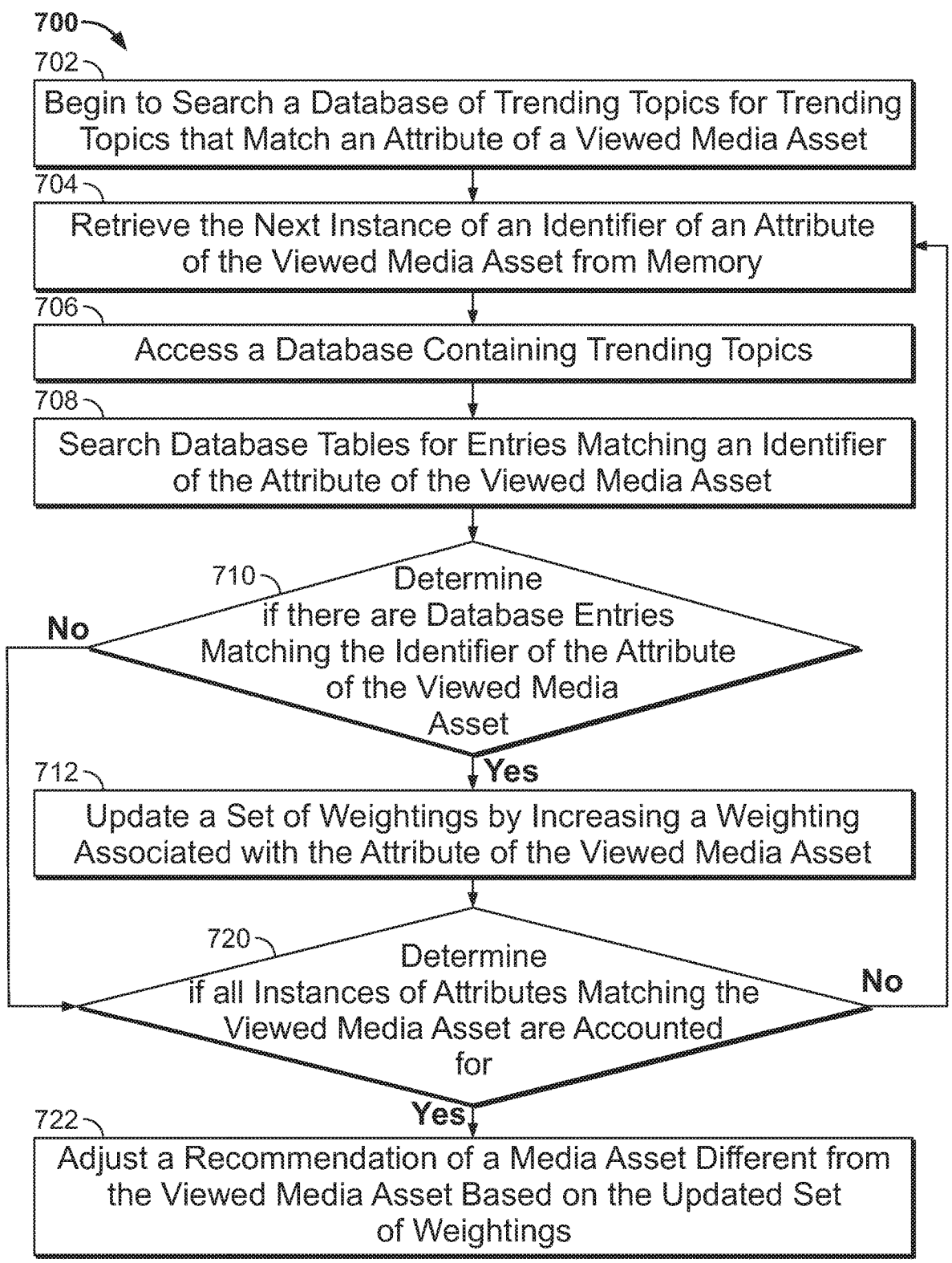
FIG. 7 depicts a flowchart for a process implemented on control circuitry to search a database of trending topics for trending topics that match an attribute of a viewed media asset in accordance with some embodiments of the disclosure.

FIG. 7 depicts a flowchart for a process implemented on control circuitry to search a database of trending topics for trending topics that match an attribute of a viewed media asset in accordance with some embodiments of the disclosure. In particular, control circuitry compares unique identifiers included in smart tags of trending topics with unique identifiers included in smart tags of media asset attributes. Process 700 is executed from commands from a media guidance application to control circuitry 404. In some embodiments process 700 may be encoded on to non-transitory storage medium (e.g., storage device 408) as a set of instructions to be decoded and executed by processing circuitry (e.g., processing circuitry 406). Processing circuitry may in turn provide instructions to other sub-circuits contained within control circuitry 404, such as the tuning, video generating, encoding, decoding, encrypting, decrypting, scaling, analog/digital conversion circuitry, and the like.

At 702, control circuitry 404 will begin to search a database of trending topics for trending topics that match an attribute of a viewed media asset based on determining, based on processing input signals at user equipment, that a user has viewed the media asset.

At 704, control circuitry 404 proceeds to retrieve the next instance of an identifier of an attribute of the viewed media asset from memory. In some embodiments, control circuitry 404 may retrieve the identifier from media content source 516 and/or media guidance data source 518 through communications network 514. In some embodiments control circuitry 404 may retrieve a single primitive data structure that represents the identifier of the attribute of the viewed media asset. In some embodiments control circuitry 404 may retrieve the identifier from a larger class or data structure.

At 706, control circuitry 404 accesses a database containing identifiers of trending topics. In some embodiments, this database may be stored locally (e.g., on storage device 408) prior to beginning the algorithm. In some embodiments the database may also be accessed by using communications circuitry to transmit information across a communications network (e.g., communications network 514) to a database implemented on a remote storage device (e.g., media guidance data source 518).

At 708, control circuitry 404 searches database tables for entries matching the identifier of the attribute of the viewed media asset. Although control circuitry 404 may be described as interacting with a single database for purposes of clarity, it is understood that the algorithm of FIG. 7 may be implemented using multiple independent or cross-referenced databases.

At 710, control circuitry 404 determines if there are database entries matching the identifier of the attribute of the viewed media asset. In some embodiments control circuitry 404 may receive a signal from the database indicating that there are no matching entries. In some embodiments, control circuitry 404 may instead receive a list of indices or data structures with a NULL or dummy value. If control circuitry 404 identifies that there are database entries matching the identifier of the attribute of the viewed media asset, the algorithm proceeds to 712. Otherwise, the algorithm proceeds to 720.

At 712, control circuitry 404 executes a subroutine to update a set of weightings by increasing a weighting associated with the attribute of the viewed media asset. Afterwards, the algorithm may proceed to 720 where it is determined if there are further instances of attributes of the viewed media asset that need to be accounted for.

At 720, control circuitry 404 determines if all instances of attributes matching the viewed media asset are accounted for and if further iterations are needed. If further iterations are needed the algorithm will loop back to 704 where control circuitry 404 will retrieve the next instance of an identifier of an attribute of the viewed media asset. If no further iterations are needed the algorithm will proceed to 722.

At 722, control circuitry 404 executes a subroutine to adjust a recommendation of a media asset different from the viewed media asset based on the updated set of weightings.

It is contemplated that the descriptions of FIG. 7 may be used with any other embodiment of this disclosure. In addition, the descriptions described in relation to process 700 of FIG. 7 may be done in alternative orders or in parallel to further the purposes of this disclosure. For example, control circuitry 404 may submit multiple queries to the database in parallel, or it may submit multiple queries to a plurality of similar databases in order to reduce lag and speed the execution of process 700. Furthermore, it should be noted that the process of FIG. 7 may be implemented on a combination of appropriately configured software and hardware, and that any of the devices or equipment discussed in relation to FIGS. 2-5 could be used to implement one or more portions of the algorithm.

FIG. 8 depicts pseudocode for a process 800 implemented on control circuitry to search a database of trending topics for trending topics that match an attribute of a viewed media asset in accordance with some embodiments of the disclosure. In particular, control circuitry compares unique identifiers included in smart tags of trending topics with unique identifiers included in smart tags of media asset attributes. Process 800 is executed from commands from a media guidance application to control circuitry 404. In some embodiments process 800 may be encoded on to non-transitory storage medium (e.g., storage device 408) as a set of instructions to be decoded and executed by processing circuitry (e.g., processing circuitry 406). Processing circuitry may in turn provide instructions to other sub-circuits contained within control circuitry 404, such as the tuning, video generating, encoding, decoding, encrypting, decrypting, scaling, analog/digital conversion circuitry, and the like. It will be evident to one skilled in the art that process 800 described by the pseudocode in FIG. 8 may be implemented in any number of programming languages and a variety of different hardware, and that the style and format should not be construed as limiting, but rather a general template of the steps and procedures that would be consistent with code used to implement some embodiments of this disclosure.

At line 801, control circuitry 404 runs a subroutine to initialize variables and prepare to search the database of trending topics for trending topics that match the attribute of a viewed media asset, which begins on line 805. For example, in some embodiments control circuitry 404 may copy instructions from non-transitory storage medium (e.g., storage device 408) into RAM or into the cache for processing circuitry 406 during the initialization stage.

At line 805, control circuitry 404 receives instances of identifiers of attributes of the viewed media asset. In some embodiments these instances may be retrieved from stored memory.

At line 806, control circuitry 404 iterates through the various instances of the identifiers of the attributes of the viewed media asset; if only a single instance is available, the loop will only execute once. This loop may be implemented in multiple fashions depending on the choice of hardware and software language used to implement the algorithm of FIG. 8; for example, this may be implemented as part of a "for" or "while" loop, in some programming languages. In some embodiments it may be convenient to store the instances of the identifiers of the attributes of the viewed media asset in a single class or encapsulated data structure that will perform the loop as part of an internal method.

At line 807, control circuitry 404 queries a database for entries matching the identifier of the attribute of the viewed media asset of the current iteration. Depending on how the database is implemented and how the attribute of the viewed media asset is stored, an intermittent step may be required to convert the identifier of the attribute of the viewed media asset into a form consistent with the database. In some embodiments the identifier of the attribute of the viewed media asset may be encoded as a primitive data structure, and control circuitry 404 may submit the attribute of the viewed media asset as a query to the database directly. After querying the database, control circuitry 404 may receive a set of database entries matching the attribute of the viewed media asset. In some embodiments control circuitry 404 may receive these entries in the form of a data-structure, a set of indices of the database, or a set of indices of another cross-referenced database.

At line 808, control circuitry 404 will determine if there are any database entries matching the identifier of the attribute of the viewed media asset. In some embodiments, control circuitry 404 may determine this by checking if the database returned an empty data structure or a NULL value in response to the query in line 807. If there are matching database entries the algorithm may proceed to line 810. If there were no matching database entries the algorithm may instead proceed to line 817.

At line 810, control circuitry 404 executes a subroutine to update a set of weightings by increasing a weighting associated with the attribute of the viewed media asset. Afterwards, the algorithm may proceed to line 817.

At line 817, control circuitry 404 executes a termination subroutine after the algorithm has performed its function and all instances of attributes of the viewed media asset have been processed and checked against the database. For example, in some embodiments control circuitry 404 may destruct variables, perform garbage collection, free memory or clear the cache of processing circuitry 406.

It will be evident to one skilled in the art that process 800 described by the pseudocode in FIG. 8 may be implemented in any number of programming languages and a variety of different hardware, and the particular choice and location of primitive functions, logical evaluations, and function evaluations are not intended to be limiting. It will also be evident that the code may be refactored or rewritten to manipulate the order of the various logical evaluations, perform several iterations in parallel rather than in a single iterative loop, or to otherwise manipulate and optimize run-time and performance metrics without fundamentally changing the inputs or final outputs. For example, in some embodiments the code may be re-written so control circuitry 404 is instructed to evaluate multiple instances of identifiers of attributes of the viewed media asset and submit multiple database queries simultaneously using a plurality of processors or processor threads. It is also understood that although we may describe control circuitry 404 interacting with a single database, this is only a single embodiment described for illustrative purposes, and the algorithm of FIG. 8. may be implement using multiple independent or cross-referenced databases. For example, a database stored locally (e.g., on storage 408) may index or cross-reference a database stored remotely (e.g., media guidance data source 518), which may be accessible through any number of communication channels (e.g., communications network 514). In some embodiments, this may allow control circuitry 404 to utilize a look-up table or database front-end efficiently stored on a small local drive to access a larger database stored on a remote server on demand.

It is contemplated that the steps or descriptions of FIGS. 6-8 may be used with any other embodiment of this disclosure. In addition, the steps and descriptions described in relation to FIGS. 6-8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-8.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for flexibly using trending topics as parameters for recommending media assets that are related to a viewed media asset, the method comprising:
   determining that a media asset has been viewed, wherein the media asset is provided by a content provider;
   identifying a plurality of attributes corresponding to the viewed media asset;
   monitoring a plurality of social networking services to determine that a topic associated with the viewed media asset is trending;
   comparing, each of the plurality of attributes of the viewed media asset with the trending topic to determine that a respective attribute of the plurality of attributes matches the trending topic;
   determining that another respective attribute of the plurality of attributes matches the trending topic;
   updating a set of weightings corresponding to the plurality of attributes by increasing a first weighting corresponding to the respective attribute by a first amount corresponding to a first set of viewers that have interacted with the respective attribute and increasing a second weighting corresponding to the other respective attribute by a second amount corresponding to a second set of viewers that have interacted with the other respective attribute, wherein the first amount is greater than the second amount; and
   adjusting a recommendation for a media asset different from the viewed media asset based on a combined first weighting of the respective attribute and the second weighting of the other respective attribute; and
   generating for display the recommendation of the media asset different from the viewed media asset.

2. The method of claim 1, further comprising:
   receiving a search request;
   in response to receiving the search request, generating for display a plurality of media asset identifiers corresponding to results of a search performed based on the search request; and
   receiving a selection of a media asset identifier corresponding to the viewed media asset from the plurality of media asset identifiers,
   wherein adjusting the recommendation of the media asset different from the viewed media asset comprises conditionally adjusting the recommendation of the media asset different from the viewed media asset upon a condition in which the search request was used in order to access the viewed media asset.

3. The method of claim 2, further comprising refraining from adjusting the recommendation of the media asset different from the viewed media asset when the condition is not met.

4. The method of claim 2, wherein receiving the search request comprises receiving a search request for the media asset identifier corresponding to the viewed media asset.

5. The method of claim 2, wherein receiving the search request comprises receiving a search request for media assets matching an attribute of the plurality of attributes corresponding to the viewed media asset.

6. The method of claim 5, further comprising:
determining that the attribute of the plurality of attributes in the search request does not match a topic of a plurality of topics with which a threshold number of people have interacted within a period of time that is shorter than a threshold period of time; and
based on determining that the attribute of the plurality of attributes in the search request does not match a topic of the plurality of topics, refraining from adjusting the recommendation of the media asset different from the viewed media asset.

7. The method of claim 1, further comprising:
generating for display an indication that the media asset different from the viewed media asset is recommended based on a topic of a plurality of topics with which a threshold number of people have interacted within a period of time that is shorter than a threshold period of time;
receiving a command not to increase the weighting corresponding to the respective attribute;
updating the set of weightings corresponding to the plurality of attributes by decreasing the weighting corresponding to the respective attribute; and
adjusting the recommendation of the media asset different from the viewed media asset based on the updated set of weightings.

8. The method of claim 1, wherein adjusting the recommendation of the media asset different from the viewed media asset further comprises adjusting the recommendation of the media asset different from the viewed media asset based on weightings of attributes retrieved from a profile.

9. The method of claim 1, further comprising receiving a command to adjust an amount by which the weighting corresponding to the respective attribute is increased.

10. A system for flexibly using trending topics as parameters for recommending media assets that are related to a viewed media asset, the system comprising:
an input interface configured to receive input signals at user equipment; and
control circuitry configured to:
determine, based on processing the input signals, that a media asset has been viewed, wherein the media asset is provided by a content provider;
identify a plurality of attributes corresponding to the viewed media asset;
monitor a plurality of social networking services to determine that a topic associated with the viewed media asset is trending;
compare each of the plurality of attributes of the viewed media asset with the trending topic to determine that a respective attribute of the plurality of attributes matches the trending topic;
determining that another respective attribute of the plurality of attributes matches the trending topic;
update a set of weightings corresponding to the plurality of attributes by increasing a first weighting corresponding to the respective attribute by a first amount corresponding to a first set of viewers that have interacted with the respective attribute and increasing a second weighting corresponding to the other respective attribute by a second amount corresponding to a second set of viewers that have interacted with the other respective attribute, wherein the first amount is greater than the second amount; and
adjust a recommendation for a media asset different from the viewed media asset based on a combined first weighting of the respective attribute and the second weighting of the other respective attribute; and
generate for display the recommendation of the media asset different from the viewed media asset.

11. The system of claim 10, wherein the control circuitry is further configured to:
receive a search request;
in response to receiving the search request, generate for display a plurality of media asset identifiers corresponding to results of a search performed based on the search request; and
receive a selection of a media asset identifier corresponding to the viewed media asset from the plurality of media asset identifiers,
wherein the control circuitry is further configured, when adjusting the recommendation of the media asset different from the viewed media asset, to conditionally adjust the recommendation of the media asset different from the viewed media asset upon a condition in which the search request was used in order to access the viewed media asset.

12. The system of claim 11, wherein the control circuitry is further configured to refrain from adjusting the recommendation of the media asset different from the viewed media asset when the condition is not met.

13. The system of claim 11, wherein the control circuitry is further configured, when receiving the search request, to receive a search request for the media asset identifier corresponding to the viewed media asset.

14. The system of claim 11, wherein the control circuitry is further configured, when receiving the search request, to receive a search request for media assets matching an attribute of the plurality of attributes corresponding to the viewed media asset.

15. The system of claim 14, wherein the control circuitry is further configured to:
determine that the attribute of the plurality of attributes in the search request does not match a topic of a plurality of topics with which a threshold number of people have interacted within a period of time that is shorter than a threshold period of time; and
based on determining that the attribute of the plurality of attributes in the search request does not match a topic of the plurality of topics, refrain from adjusting the recommendation of the media asset different from the viewed media asset.

16. The system of claim 10, wherein the control circuitry is further configured to:
generate for display an indication that the media asset different from the viewed media asset is recommended based on a topic of a plurality of topics with which a threshold number of people have interacted within a period of time that is shorter than a threshold period of time;

receive a command not to increase the weighting corresponding to the respective attribute;
update the set of weightings corresponding to the plurality of attributes by decreasing the weighting corresponding to the respective attribute; and
adjust the recommendation of the media asset different from the viewed media asset based on the updated set of weightings.

17. The system of claim 10, wherein the control circuitry is further configured, when adjusting the recommendation of the media asset different from the viewed media asset, to adjust the recommendation of the media asset different from the viewed media asset based on weightings of attributes retrieved from a profile.

18. The system of claim 10, wherein the control circuitry is further configured to receive a command to adjust an amount by which the weighting corresponding to the respective attribute is increased.

* * * * *